United States Patent
Briskin et al.

Patent Number: 5,960,118
Date of Patent: Sep. 28, 1999

[54] METHOD FOR 2D AND 3D IMAGES CAPTURING, REPRESENTATION, PROCESSING AND COMPRESSION

[76] Inventors: Miriam Briskin, Emek Ayalon 33, Givat, Zeev 90917, Israel; Yoram Elihai, Bikat Hayareh 3/12, Ashdod 77701, Israel; Yosef Yomdin, Hanasi Harishon 57/7, Rehovot 76303, Israel

[21] Appl. No.: 08/793,940
[22] PCT Filed: Jul. 3, 1996
[86] PCT No.: PCT/IL96/00033
§ 371 Date: Jun. 27, 1997
§ 102(e) Date: Jun. 27, 1997
[87] PCT Pub. No.: WO97/02521
PCT Pub. Date: Jan. 23, 1997

[30] Foreign Application Priority Data

Jul. 6, 1995 [IL] Israel ......................................... 114475

[51] Int. Cl.$^6$ ................................................. G06K 9/00
[52] U.S. Cl. ........................................... 382/243; 382/286
[58] Field of Search .................... 382/276, 293, 382/307, 233, 243, 154, 190, 209, 224, 232, 235, 239, 240, 241, 242, 244, 248, 251, 284, 285, 298, 312, 181, 192, 195, 253, 196, 197, 282, 199, 201, 202, 203, 286, 204, 205, 288, 217, 291, 218, 308; 348/403, 384, 390; 358/432, 433, 426; 395/114

[56] References Cited

U.S. PATENT DOCUMENTS

| | | | |
|---|---|---|---|
| 4,956,869 | 9/1990 | Miyatake et al. | 382/243 |
| 4,969,201 | 11/1990 | Takasaki et al. | 382/241 |
| 5,020,121 | 5/1991 | Rosenberg | 382/243 |
| 5,036,544 | 7/1991 | Sakave et al. | 382/241 |
| 5,048,112 | 9/1991 | Alves et al. | 382/243 |
| 5,050,222 | 9/1991 | Lee | 382/197 |
| 5,086,482 | 2/1992 | Kumagai | 382/242 |
| 5,231,678 | 7/1993 | Takatori et al. | 382/154 |
| 5,243,665 | 9/1993 | Maney et l. | 382/154 |
| 5,249,035 | 9/1993 | Yamanaka | 382/154 |
| 5,410,643 | 4/1995 | Yomdin et al. | 395/120 |
| 5,420,942 | 5/1995 | Levit | 382/276 |
| 5,510,838 | 4/1996 | Yomdin et al. | 348/384 |

*Primary Examiner*—Jose L. Couso
*Assistant Examiner*—Bijan Tadayon
*Attorney, Agent, or Firm*—Evenson, McKeown, Edwards & Lenahan, P.L.L.C.

[57] ABSTRACT

A process for producing a compressed representation of 2D and 3D images. The image is represented in a compressed form by approximating regions with slowly changing brightness or color, by a background, formed by low degree polynomials. Fast brightness or color changes are represented by special models, including local models and curvilinear structures. Visual adjacency relations between the models are identified, the background partition represents these adjacency relations, curvilinear structures are approximated by spline functions. The three-dimensional image is represented by producing one or several compressed images of the scene from different positions, in which a depth value is associated to each model. A view of the scene from any prescribed point is produced by a geometric processing of these compressed data.

22 Claims, 8 Drawing Sheets

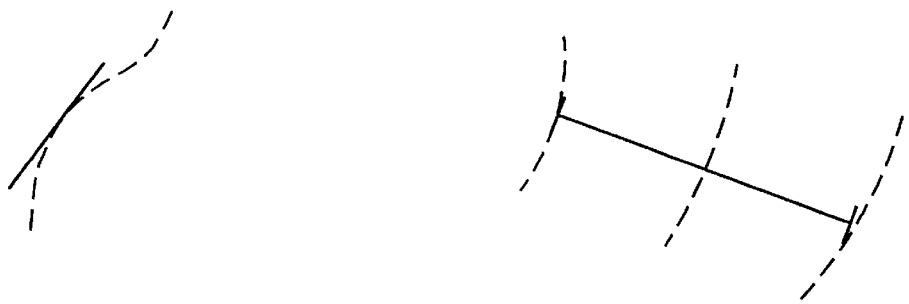
FIG.1
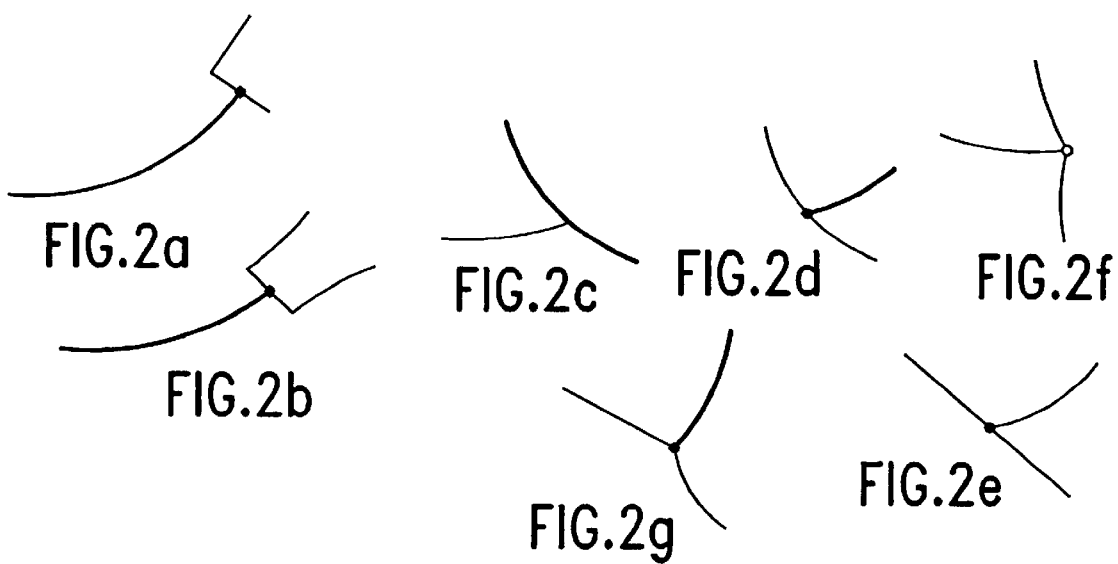
FIG.2a
FIG.2b
FIG.2c
FIG.2d
FIG.2f
FIG.2e
FIG.2g

METHOD FOR 2D AND 3D IMAGES CAPTURING, REPRESENTATION, PROCESSING AND COMPRESSION

FIELD OF THE INVENTION

This invention relates to apparatus and method for representing 2-dimensional and 3-dimensional scenes and images in a compressed form, particularly, but not exclusively, for the purpose of storing and/or transmitting the compressed data and subsequently reconstructing the picture or the 3D-scene, as seen from any prescribed point, in a manner as faithful as possible.

BACKGROUND OF THE INVENTION

The representation of various objects by data compression is a problem with which the art has been increasingly occupied in recent times. As far as the usual images and videosequences are concerned, a background of the present invention is described in the Israeli patent application IL 103389 (the priority of which is claimed in U.S. Pat. No. 5,510,838). Representation of three-dimensional scenes and objects, which becomes increasingly important in recent times, requires imcomparably bigger amounts of information. Also fast representation and rendering of three-dimensional scenes as seen from an interactively prescribed point, presents difficult computational problems. The invention presents a method for an automatic capturing and highly compressed representation of 2D and 3D scenes and images with a subsequent fast rendering.

SUMMARY OF THE INVENTION

A. Main applications of the invention 1. 3D-itineraries

A 3D-itinerary is a compact representation of a chain of 3D-scenes along a certain camera trajectory. The user can interactively create (in real time on a PC or a comparable platform) a photorealistic quality images of the represented scenes, as seen from any prescribed point in a vicinity of the initial trajectory. In particular, the user can "fly" in real time inside the represented space.

The product consists of two parts:
1. A software package (and/or a dedicated board) for an off-line creation of 3D-iteneraries. An input for a preparation of a 3D-itinerary is a usual videosequence, showing the desired 3D-scenes from a certain camera path. Then the package completely automatically creates the corresponding 3D-itinerary (in minutes of a software processing for one scene).
2. A simple PC (or comparable) software package for real time interactive "traveling" along the 3D-itinerary.

Our 3D-iteneraries are strongly compressed, and the data volume of a complete 3D-representation of a certain scene (which allows one to see if from any prescribed point), is comparable with the data volume of a single (noncompressed) 2D-image of the same scene.

The main proposed applications include computer assisted training, advertising, computer games and other multimedia applications.

It is important to stress that the 2D-images, reconstructed from a 3D-itinerary, faithfully represent the scene, so creation of 3D-iteneraries can be alternatively called "3D-compression". In applications, where the fidelity to the original is less important, while the high quality of the images must be, of course, preserved (like in computer games imaginary) much more compact virtual 3D-images and virtual 3D-iteneraries can be used (see below).

2. Virtual 3D-images

A virtual 3d-image is a highly compressed representation of a virtual 3D-scene, created from one or several high quality still images by special interactive tools. The end-user interactively produces in real time photorealistic quality images of this scene from any desired point. These images are not authentic to the real views of a certain 3D-scene, but they provide a complete visual illusion of the required motion inside the scene.

The product consists of two parts:
1. A toolkit for an interactive creation of virtual 3D-images. An input, consists of one or several still images. The toolkit allows the user to interactively create a 3D-structure on these images, to superimpose them, to supply "invisible parts" etc. In many aspects our tools are similar (and in fact, include) the standard toll used in Pre-Press and Desk-Top Publishing image processing.
2. A software package for images reproduction, identical to the package, used for 3D-iteneraries.

Virtual 3D-images are compressed to $1/10$ up to $1/50$ of the volume of the usual still image. They can be combined into virtual 3D-iteneraries, similar to the complete 3D-iteneraries, described above. However, virtual 3D-iteneraries are compressed to a much smaller data volume, they do not require detailed videosequences of the scene for their preparation, and they provide a complete visual illusion of the motion inside the represented space. A "true" 3D-data, created automatically by our package from a videosequence, can be incorporated into a virtual 3D-image (or a virtual 3D-itinerary) together with interactively produced parts.

The main proposed applications include computer games, advertising, computer assisted training.

3. Combined 3D-photorealistic data

If a true 3D-structure of a certain scene is available, as well as its photorealistic image, a combined structure can be created, based on our representation of the image and (in some cases) of the geometric data as well. This combined data is strongly compressed, and it allows for a fast photorealistic rendering (ray tracing, illumination effects, etc.) And for a fast producing a view from any prescribed position.

One important case is a combination of a digital terrain mapping (DTM) with an air photography. In this case a photorealistic 3D-terrain model is created with the DTM data compressed approximately 1:10 and the (black and white) image compressed approximately 1:20 (at the highest quality) . This model allows for a very fasts production of the terrain image from any prescribed point.

The product consists of a software package for an off-line creation of a combined data, and a simple PC software package for a real time photorealistic rendering and producing a view from any prescribed position.

The fact that our combined 3D-photorealistic structure is strongly compressed, allows one to cover much wider area with the same data volume. All the image rendering operations are performed on compressed data, and as a result these operations are very fast.

The main proposed applications include moving maps, databases for flight simulators, other kinds of computer assisted training, advertizing, computer games etc.

4. Images analysis

Our image representation by itself provides a highly detailed low-level image analysis, which forms a basis for a subsequent patterns and textures extraction, image segmentation, etc.

The product consists of a software package, containing a developed set of interactive tools for a visualization and a detailed analysis of various image features. In particular, the package contains tools for an extraction of high-level image patterns.

5. Image compression

The product consists of software packages (and/or dedicated boards) for a fast compression of still images and video sequences, and a simple PC software package for decompression and image manipulation.

Still images compression provides a fast compression and decompression of various types of still images, with a compression-to-quality curve better than of the standard compression methods. Allows for image processing on compressed data. Allows for an adjustment to special types of images and to special quality requirements. In particular, some prescribed types of visual details can be preserved on any compression level.

Videosequences compression provides a very low bit rate high quality compression. Shares the above mentioned advantages of the still compression.

B. Broad summary of the invention

1. Representation of still images

The Normal Forms (NF) representation of a picture is composed of two parts:

a. Large homogeneous areas (background) which can be easily approximated by (and hence represented as) low degree polynomials.

b. Regions with more complicated structure (e.g. involving edges, ridges, low scale details or other complicated features) which are captured by special mathematical models, called Normal Forms. These mathematical models serve as building blocks from which the image is constructed.

The following specific features provide a high efficiency of our representation:

1. The scale of our models is small enough (typically, few pixels) to provide a high fidelity image reconstruction.

2. Image details, captured by our models, are defined in simple mathematical terms, thus allowing for an effective and computationally inexpensive detection.

3. There is a very small number of types of models.

Each model of a certain type is completely characterized by a few continuous parameters, allowing for a precise adjustment to an image structure. We call these models Normal Forms, since by their nature they are very close to normal forms of singularities, known in mathematical Singularity theory.

While the representation of the background shares common features with the conventional methods (improving them due to the fact that only large-scale details are to be captured) the introduction of the Normal Forms constitutes an entirely new step which, essentially, replaces pixels (as building blocks of a picture) by the elements of a (normally) much coarser scale with no loss of visual information.

On the other hand, NF representation is a complete decomposition of the image into (low scale) objects together with a complete description of the visual adjacency relations between those objects.

This allows us to trace the motion of these objects in neighboring videoframes, to detect their depth and ultimately to make them building blocks of a 3D-image representation.

It must be stressed that the NF representation is completely based on a low level image analysis. Its construction is local and mathematically straightforward and does not involve semantic analysis. As a result, obtaining NF representation is a stable and computationally inexpensive procedure.

The power of our representation can be illustrated by the following facts:

1. Passing to NF representation implies no visual degradation of the image, and so is visually lossless. On the other hand, the volume of the data involved in it is a fraction of the data volume of the original image. Thus the NF representation by itself provides an order of magnitude image compression. Combined with an additional quantization of the parameters, according to their psychovisual significance, and with a lossless entropy compression, the NF representation provides an image compression technology, whose compression-to-quality curve is superior to that of the standard compression techniques.

2. Any image processing operation can be performed on NF's. Indeed, our models—Normal Forms, and their parameters have a very simple visual meaning. As a result, any operation defined in terms of a desired visual effect, can be interpreted as a simple operation on the parameters of our models, i.e. as an operation on a NF representation of the image.

3. The objects, constituting the NF representation, behave in a coherent way in videosequences. This allows for a motion detection much more efficient than in conventional schemes. Indeed, we can capture a motion of our objects in different directions, various "generalized motions" like defocussing of the camera etc. On this base a very low bit rate videocompression scheme has been developed.

2. Representation of 3D-scenes: Local 3D-Images

1. Depth detection.

Coherent behavior of our objects on neighboring videoframes (or on close still images of the same scene) allows for an effective depth detection in 3D-scenes: "the same" objects can be identified on 2D0-images, taken from nearby camera positions, and then the depth of each object can be easily computed. Since the Normal Forms represent faithfully the visual content of the image, the depth is faithfully represented at any part of the image, and not only for isolated details.

2. Depth representation.

The depth (detected as described in 1) can be associated to each of our objects (NF's), thus creating a local 3D-image, which represents the 3D-scene, as seen from a vicinity of the initial camera position. The local 3D-images of the same scene, taken from different points, can be combined to form a global 3D-structure, representing the scene as seen from any prescribed point.

Notice that the local 3D-extension of an image, represented by NF's, causes only a minor increase in the data volume, so our local 3D-images are still compressed to a small fraction of the data of the usual 2D still images.

3. Data blending.

Various forms of the NF organization (that of still images, of videosequences, virtual 3D-images etc.) are completely compatible and can be combined with one another or with additional structures, like geometric 3D-models, DTM (Digital Terrain Mapping), additional sensors data etc.

BRIEF DESCRIPTION OF THE DRAWINGS

FIG. 1 illustrates representation of segments and edge elements by elements of the third-degree curve.

FIGS. 2a–2b show the adjacency of the edge, coupled with a ridge, and the free continuation of this edge.

FIGS. 2c–2e show the adjacency of the edge or ridge, joining another edge or ridge at one of its inner points.

FIGS. 2f–2g show the adjacency of several edges or ridges, emanating from the same point.

I. Two-dimensional image representation

Figure 3A:
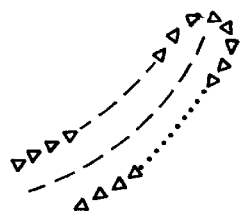
FIG. 3 shows ridges with two adjacent edges on both sides. Such ridges are distinguished from the rest of the ridges, and are called the N3-models. Temporarily all the information about the central ridge and two adjacent edges is stored for these models. Later it is replaced by the profile information.
FIG. 3b shows two ridges or N3-models (or their parts), adjacent to the same edge. This relation (and the corresponding subdivision) is explicitly memorized.

The following improvements can be introduced into the process of image compression, as described in Israeli Patent Application IL 103389 (the priority of which is claimed in U.S. Pat. No. 5,510,838).

1. Approximation scales

The size of 4×4 pixels of the approximation block has been suggested in IL 103389 as a preferred one. However, to improve capturing a small details, the scale of 3×3 pixels blocks can be used. In particular, this means that the central points of the blocks coincide now with the image pixels (and not with the central points between the pixels, as for 4×4 blocks). Moreover, a weighted approximation on these blocks can be used, with a Gaussian-type weight, concentrating on the center of the block.

On the other hand, the cubic approximation, which is used in IL 103389 to construct the "edge elements", is ill-defined on the 3×3 pixels blocks. Consequently, it is performed on 5×5 pixels blocks, also with a Gaussian weighting. Thus on the initial stage of the block approximation, the approximate on two scales is computed: a quadratic approximation on 3×3 pixels block and a cubic approximation on 5×5 pixels blocks.

2. Third-order approximation in constructing segments, edge elements and adjacency relations between them In the implementation of the compression method, described in IL 103389, the segments are constructed based exclusively on the quadratic approximation, while in edge elements construction the cubic approximation is used only partly, to determine the state of the ends of the edge elements.

The experiments show that the cubic polynomials, approximating the picture on 5×5 pixels blocks, capture in a stable way some important image features, which cannot be captured by quadratic polynomials:

(i) Curvature of the ridges and the edges.

(ii) The "corners" of the ridges and the edges.

(iii) Smaller scale geometry of the ridges and the edges. This accurate geometric information is very important for a better approximation of the image on one side, and for distinguishing between various kinds of the image texture, on the other. In particular, it allows one to eliminate the edges, constructed in highly textured areas, which are not necessary for a faithful image representation.

Another important advantage of the third order information is that it allows one to determine the position and the direction of the constructed elements with a much higher accuracy (an improvement may be from a half-pixel to a one-tenth pixel). This accuracy improvement is very important in two aspects:

(i) The ridge and edge component, constructed from the segments and edge elements on later stages, obtain a simpler (and mathematically, smoother) geometric shape. Consequently, they can be approximated and encoded with less information stored.

(ii) The adjacency relations between segments and edge elements are established in a more coherent way, which improves further model construction.

Finally, if the third order-approximation of the image is used, the segments and the edge elements can be represented not by the first-order elements, as in IL 103389, but by the third-order ones. This means that both segments and edge elements are now represented by an element of the third-degree curve at their central points (see FIG. 1).

A much smaller number of such elements can be used to faithfully represent a ridge (edge) component. This strongly simplifies the computation and significantly increases the computational stability of the algorithm. Mathematically, the required third-order representation of the segments and the edge elements is obtained as follows:

For $z=f(x,y)$—the third order polynomial, representing the brightness function, at the point where the usual segment has been detected, as described in IL 103389, the third-order segment in is the Taylor polynomial of degree 3 of the solution of a system of differential equations $\dot{x}=\partial f/\partial x$, $\dot{y}=\partial f/\partial y$ passing through the central point of the segment. The third order edge element is given by the Taylor polynomial of degree 3 of the equilevel curve $f(x,y)=\text{const}$, passing through the central point of the usual edge element.

It should be stressed that the third-order-polynomial approximations of a typical image are highly unstable, if considered in an unstructured way. This instability presents one of the main difficulties in using the third-order information. The computation scheme, presented above, shows how this difficulty can be settled: the third-order polynomials are used only at the points, classified on the base of the first and the second-order information, and the only questions that are asked are the ones whose answers are insensitive to the possible noise.

3. Additional types of adjacency relations

In IL 103389 some basic adjacency relations between segments and edge elements have been constructed. However, these relations do not cover all the possible visual adjacencies. In order to provide a faithful image representation, the models constructed must represent faithfully also all the visual adjacency between them. Therefore, the following additional adjacency relations can be taken into account:

(i) The adjacency of the edge, coupled with a ridge, and the free continuation of this edge (FIGS. 2a, b).

(ii) The adjacency of the edge or ridge, joining another edge or ridge at one of its inner points (FIGS. 2c,d,e).

(iii) The adjacency of several edges or ridges, emanating from the same point (FIGS. 2f,g). These new adjacencies are constructed in the same way as the old ones, on the base of a geometric proximity between the segments and the edge elements. The third-order information, described above, is very important in this construction.

4. Segments classification

Using the above adjacencies, the segments can be subdivided into "strong" and "weak", according to their position on the central line of the ridge or on its margins. This classification is not always stable, so it is actually done by associating to each segment a number between 0 and 1—its "weakness". This number is later used in the background construction. This completes the list of the main improvements on the level of the initial detection.

On the level of model construction, several additional improvements can be introduced.

5. Adjacency relations between the models

In IL 103389 the main adjacency (or adherency) relations used are those between the ridge and the edges, which form the slopes of this ridge (or, dually, between the edge and its margin ridges). These relations are used in IL 103389 to drop the redundant information and to simplify the models constructed. However, the adjacency relations, used in IL 103389, form only a part of visually important proximity relations between the constructed models. In order to faithfully represent the image, all the visible adjacency relations between the models must be included into representation. This is done as follows:

(i) Ridges with two adjacent edges on both sides are distinguished from the rest of the ridges, and are called the N3-models. Temporarily all the information about the central ridge and two adjacent edges is stored for these models. Later it is replaced by the profile information, as described below (FIG. 3a).

Figure 3B:
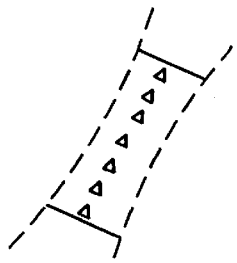

(ii) If two ridges or N3-models (or their parts) are adjacent to the same edge, this relation (and the corresponding subdivision) is explicitly memorized (FIG. 3b).

Figure 3C:
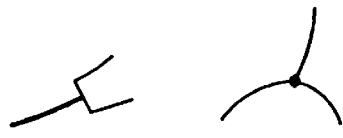
Figure 4:
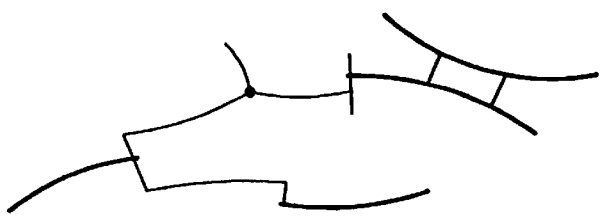
FIG. 4 shows a chain of adjacency relations between several models.

(iii) The local adjacency of the types 3i, ii, iii above are interpreted as the corresponding adjacency relations between the models (FIG. 3c).

As a result, the models constructed are joined to one another at certain points, called "joints". These joints form an important element of the models structure. Consequently, the models (ridges, edges, N-3 models) are organized into chains (called "graphics"). The vertices of these graphs are joints, while the segments are edges, ridges and N-3 models).

6. The structure of the joints

Figure 5:
FIG. 5 shows joints of the types N3-E-E-, N3-E, N3-N3, N3-R, R-N3, N3-R-R.

As is clear from the description above, joints play an organizing role in the models structure. Respectively, they are construed in a way that allows to keep and process all the relevant information. The following types of joints are used: N3-E-E, N3-E, N3-E-N3, E-R, E-R-R, N3, . . . ,N3, E, . . . ,E (see FIG. 5). N3 models can be replaced by ridges.

The following information is memorized at each joint:

(i) Its coordinates.

(ii) The types and the endpoint coordinates of the models entering this joint.

(iii) The profiles of the entering models.

Figure 6:
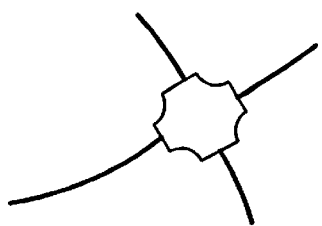
FIG. 6 shows a "second order joint", representing several elementary joints.

All these data at a given joint may happen to be highly redundant (as, for example, the profiles of the entering models, the mutual positions of the endpoints, and the directions of the models). This redundancy is used on the quantization and encoding stage to increase the compression. In many cases, several "elementary joints", as described above, form a connection with a highly interrelated geometry (see FIG. 6) . In this case, a "second order joint", representing this connection and using its data redundancy, can be constructed.

7. The profiles of the models

Figures 7A, 7B, 7C:
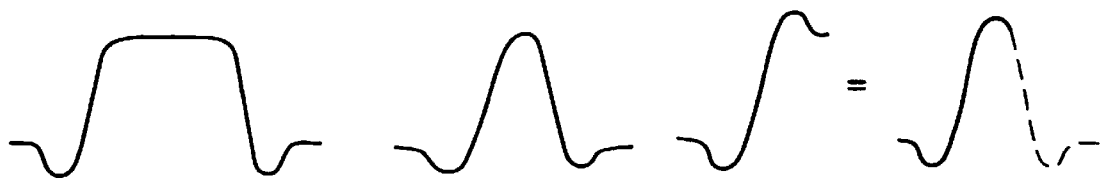
FIG. 7a shows the profile of the N3-model.
FIG. 7b shows the profile of the ridge. It is obtained by substituting into the N3-profile some specific values of parameters.
FIG. 7c shows the profile of the edge. For an appropriate choice of parameters, it coincides with the margin part of the N3-model profile.

The profiles of the ridges and the edges, as constructed in IL 103389, faithfully represent most of the features of typical images. However, new adjacency relations, introduced above, require an appropriate profile adjustment at the joints. Respectively, the mathematical expressions, representing the profiles of the models, are chosen to satisfy the following requirements:

(i) The profile of the N3-model contains, in addition to the parameters described in IL 103389, the "interior width" parameter (FIG. 7a).

(ii) The ridge profile is obtained by substituting into the N3-profile some specific values of parameters (FIG. 7b).

(iii) The edge profile, for an appropriate choice of parameters, coincides with the margin part of the N3-model profile (FIG. 7c).

This choice of profiles allows for a continuous profile adjustment at the joints.

8. An experimental profile determination

Experiments show that the optimal choice of profiles depends strongly on the image to be represented (in particular, on the equipment used in this image production, on the digitalization performed, etc.). This choice turns out to be extremely important for a faithful image representation. The choice, described in IL 103389, is appropriate for most of the usual images. However, in some cases it may be desirable to find and use specific profiles for each image compressed (an additional information to be stored is negligible).

Figure 8:
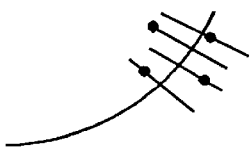
FIG. 8 illustrates an experimental profile determination.

This can be done as follows: Let l be a (ridge or edge) component, for which the profile is to be experimentally determined. For each pixel on the distance of several pixels to l, the value of the image brightness at this pixel is represented as the coordinate y value (in a plane coordinate x,y), while the x value is the distance of the pixel to the curve l (see FIG. 8). The brightness values for all the neighboring to l pixels, represented in this form, cover a smooth curve in the (x,y)-plane, which is the curve of the experimental profile for the model l. This curve can be later approximated by a polynomial, splines, etc., and the resulting approximation can be used in a compressed data representation.

9. Model completion and simplification

Figure 9A:
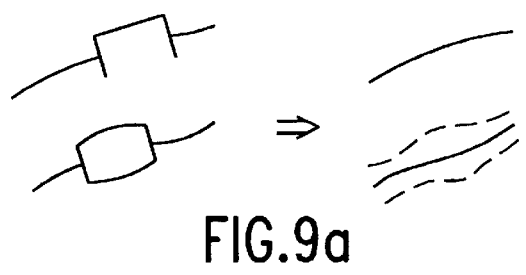
FIG. 9 and FIG. 10 illustrate different types of model completion and simplification.

The structure of the model graphs and of their profiles, as described above, allows one in many cases to simplify significantly the model structure without compromising the fidelity of the image representation. The following completion operations are used:

(i) N3-model completion. The sequence N3-N-N3 or N3-E-E-N3, completed to a continuous N3 model (FIG. 9a). The N3 profile described above allows for a faithful representation of the image.

Figure 9B:
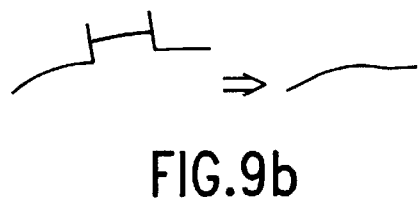

(ii) Edge completion. The sequence E-R-E or E-R-R-E is completed to a continuous edge model (FIG. 9b).

Figure 9C:
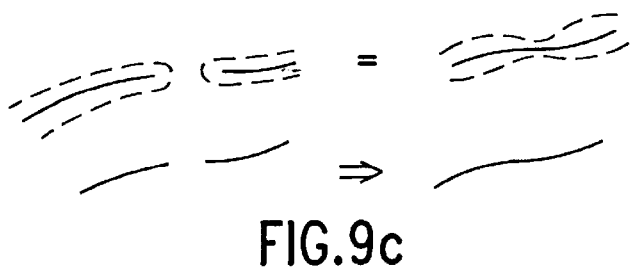

In both cases the gaps in N3 or edge model can be completed exactly in the same way (FIG. 9c).

Figure 9D:
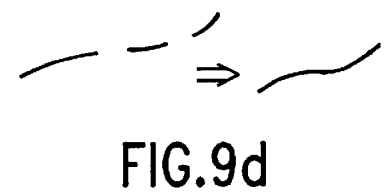

(iii) N3 reconstruction. A sequence of edges and adjacent ridges can be transformed into a continuous N3 model, as shown in FIG. 9d.

Figure 10A:
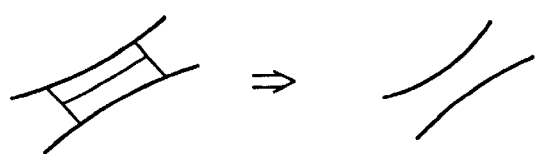

The following additional simplifications can be performed:

(i) A N3 model or a ridge, adjacent from both sides to another N3 or ridge, can be dropped (FIG. 10a).

Figure 10B:
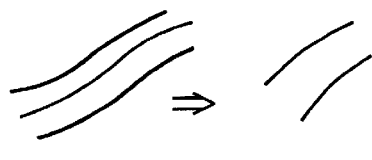

(ii) An edge, adjacent from both sides to ridges (or other ridges) can be dropped (FIG. 10b).

10. Background construction

Several versions of the background construction have been described in IL 103389. Usually they provide a good quality image reconstructions. However, in many cases further improvements must be introduced, to guarantee a high compression and a high fidelity image reconstruction for all the range of possible images. The main difficulty in the background construction can be described as follows: The background represents the part of the image which is not captured by the models. It is characterized by a slow gradual change of the brightness of the image. The models-edges, ridges and N3-models separate the image into two parts: one captured and represented by these models themselves, and the other represented by the background. This second part may consist of many separate connected pieces. Indeed, the brightness of the image can jump discontinuously when passing from one background component to another.

Figure 11:
FIG. 11 illustrates an effect of incorrect edge identification.

A mistake in this background partition usually results in a serious reconstruction error. For example, if a certain edge, separating two background regions of sharply different brightness, has been detected with a gap, the background will be represented by one connected region, instead of two, and the brightness values will be smudged over the boundary between the regions (see FIG. 11). The same problem will be caused by any gap between two models, which are visually adjacent. Thus, to provide a correct background reconstruction, all the visual adjacencies between the models must be detected and explicitly represented. This detection and representation are described in Sections 5 and 6 above.

11. Background partition

The background partition is constructed according to the following rules:

(i) Each edge subdivides the background along the central line of this edge into two parts (locally).

Figure 12:
FIG. 12 shows how the ridges and the N3-models subdivide the background locally into three parts: the model support and two side-parts. The separating lines are the central lines of the slope edges of the model.

(ii) The ridges and the N3-models subdivide the background locally into three parts: the model support and two side-parts. The separating lines are the central lines of the slope edges of the model (FIG. 12).

Figure 13:
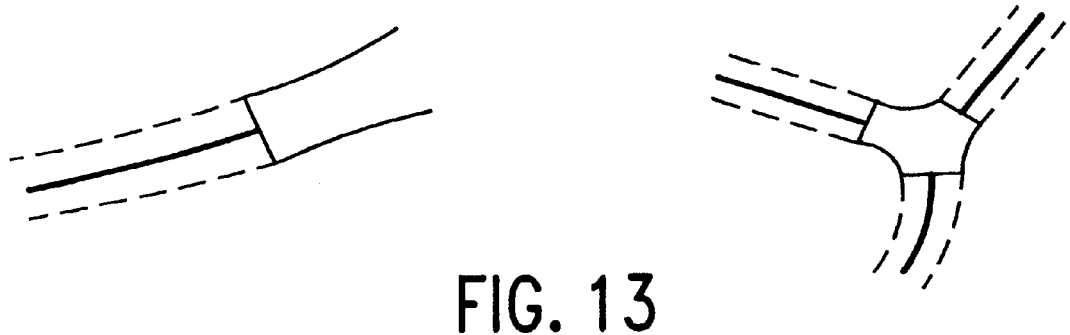
FIG. 13 shows that the parts of the background partition meet one another in a coherent way at all types of joints, as described herein.

An important feature of this partition is that its parts meet one another in a coherent way at all types of joints, described in Section 6 above (see FIG. 13).

12. Background representation

As a partition of the background is completed, the representation of the gray level values of the image over the background regions is achieved as follows:

(i) A background cell size is chosen. Usually it is between 4 and 16 pixels (ii) For each background cell $C_i$, and for each background region $B_j$, intersecting this cell, a low degree polynomial is computed, approximating the background values on $C_i \cap B_j$. The degree of the approximating polynomial is usually 0, 1 or 2. For 6×6 and 8×8 background cells, zero degree polynomials usually provide a faithful image reconstruction.

(iii) For each background cell $C_i$, and for each background region $B_j$, a number of background representing points is chosen in $C_i \cap B_j$, in a distance of ¼ of a cellsize from one another.

(iv) A piramidal background representation can be chosen to provide a higher compression. For a background cell size l, the background is first represented (according to i and ii) on the cells of size 2l. Then the background data on the size l are stored as the difference with the corresponding data on 2l-scale. This construction can be repeated several times, providing a piramidal representation of the background data.

It is important to stress that the above representation can be arranged in such a way that the intersections $C_i \cap B_j$ (which are irrelevant to the represented image: the background regions $B_j$ are defined in a completely invariant way, with no reference to the cells $C_i$) are not explicitly computed. Instead, the approximating polynomials and the background reference points are constructed using a certain weighted approximation in a neighborhood of each cell $C_i$. The weights in this approximation (as well as in ii above) are determined by the type of basic elements, detected in each pixel of the background region: the "empty points" (the set $A_1$ in the notations of IL 103389 get the highest weight, while the "strong" segments get the lowest weight.

13. Approximation of the geometry

An approximation of the ridges and the edges is based on polygonal lines. Such an approximation usually provides the required compression and reconstruction quality, but in some cases it can cause some undesirable visual effects (staircase) on smoothly curved lines. The following improvements overcome this difficulty:

(i) The curves are approximated by the pieces of quadratic parabolas.

(ii) The highly curved regions of the approximated curves are detected in advance (as described in Section 2 above) These regions are approximated first.

Figure 14:
FIG. 14 illustrates an approximation of the geometry by parabolic pieces.

(iii) The rest of the curve is approximated by the parabola pieces, starting from the ends of the curved regions, according to the description given in IL 103389, step 7 (see FIG. 14). Notice that the mean square approximation, as well as various forms of the spline approximation, can be used at this stage.

The smooth approximation, as described above, usually contain a serious data redundancy. In order to increase compression, this redundancy can be removed in different ways. In particular, the direction and the curvature of each parabolic segment can be used as the prediction for the next one, etc.

14. Scales hierarchy

Some well-known properties of human visual perception prescribe certain principles of data capturing, representation and quantization to the compression scheme presented. In particular, small color errors are better detectable on big areas. In a geometry representation, a relative error is visually important (with respect to the size of the represented models).

Respectively, one can formulate the following principles:
(i) The values which are to be represented on a certain scale must be captured by averaging on the same scale. This concerns the profile values of the ridges, edges and N3-models, as well as "hills". As far as the background is concerned, an average brightness value of each color must be preserved with a relatively high accuracy.
(ii) The brightness values of curvilinear models can be quantized to a much higher extent than the background values (and the brightness values of "hills" can be quantized higher than those of curvilinear models).
(iii) A relative representation of lengths must be used in a geometry quantization (i.e. shorter lengths must be stored with a higher absolute accuracy).
(iv) In an incremental data representation, the smaller scale data must be always related to the bigger scale data. For example, the margin values of the curvilinear models must be quantized around the corresponding background values, and not vice versa.

15. Capturing the finest scale

Although the suggested representation provides a visually faithful image reconstruction, in some applications it can be important to cover all the compression-quality curve, starting with the lossless compression. In order to provide such a covering, the following approach can be used:
(i) The image is compressed by the proposed method up to a desired compression.
(ii) A difference between the original image and the reconstructed one is formed.
(iii) This difference is compressed by one the methods, providing the full compression-quality curve covering (for example, based on DCT or wavelets).

Such a combination provides a full covering of the compression-quality curve. As the experiments show, the resulting compression for each required quality is higher than that achieved by the additional method by itself.

If the local basis method is used (such as some wavelets-based ones), the corresponding data can be included into the normal form representation. In particular, all the specific features of the presented method (such as operations on compressed data, motion detection, etc., see IL 103389 are preserved in the combined method.

II. Three-dimensional data representation

1. Virtual 3D-image structure

A virtual 3D-image is a (highly compressed) photorealistic quality representation of a certain 3D-scene, as seen from a vicinity of the initial view-point. A virtual 3D-image serves as an input for the 3D-viewer, which allows the user to interactively produce an image of the scene, as seen from any prescribed point.

The representation of virtual 3D-images comprises the following elements:
(i) Basic models, which are exactly the same as in the 2D-images compression, described above.
(ii) Each of these models has additional depth parameters.

These depth parameters are associated with the profiles of the models, and are represented exactly in the same way as the brightness parameters.

Figure 15A:
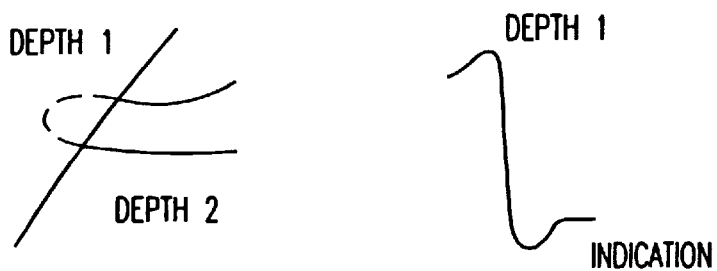
FIG. 15a shows a depth parameter, representing the depth of those background parts, bounded by an edge, which are closer to the viewer.

More specifically, for each of the models, the following depth parameters are used:

Edge.
(a) One depth parameter, representing the depth of those background parts, bounded by this edge, which are closer to the viewer (FIG. 15a).
(b) An indication of the side of the edge, on which the background depth is greater than the edge's depth (or an indication that the depth values on both sides are the same).

Figure 15B:
FIG. 15b shows ridge depth parameters: one representing the depth of the central line of the ridge, and an indication of the side (or sides) where the background depth differs from the central line's depth.

Ridge or N3-model.
(a) One depth parameter, representing the depth of the central line of the ridge.
(b) An indication of the side (or sides) where the background depth differs from the central line's depth (FIG. 15b).

Hill or hollow.
(a) A central point depth.
(b) An indication of one of two possibilities: either the background depth is equal to, or it differs from the central depth.

Figure 15C:
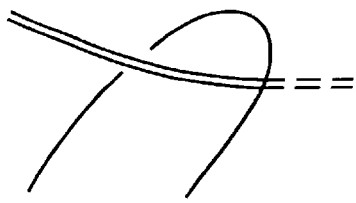
FIG. 15c shows an intersection of two models with different depth values.

An important feature of the above models, as representing the virtual 3D-image, is that different models can intersect one another, assuming that at the intersection points they have different depth values (FIG. 15c).

Background.

The depth of the background is represented in the same way as the background brightness (see I, 10, 11, 12 above), with the following main difference: over each background cell the background of the virtual 3D-image may have several layers (or branches). More accurately, locally the representation of virtual 3D-images is organized as follows:
(a) Over each background cell there are several background branches, each with a different depth range.
(b) Among these branches there are regular and singular ones. A regular branch has exactly the same form as described in I, 10, 11, 12 above, i.e. it contains the models, passing over the considered cell with the depth corresponding to the considered layer. It contains also the background partition, constructed exactly as in I.11. To each region of this partition a depth value is associated, exactly as the brightness value in I.12. However, there is an important distinction: some regions of the partition can be associated with a special depth value, called "transparent". The "transparent" depth value is associated with those regions, whose bounding edges or N3-models have on the corresponding side an indication of the bigger background depth than their central line depth.

Figure 16:
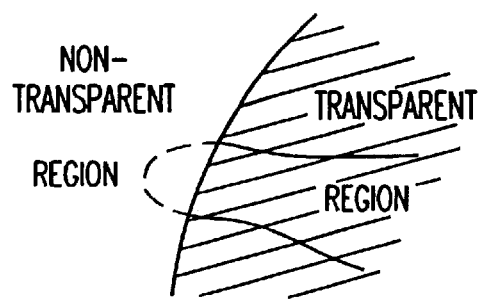
FIG. 16 shows transparent and non-transparent regions of the background.

Finally, the non transparent regions also get a brightness value, as described in I.12. The transparent regions do not carry any brightness (see FIG. 16).
(c) A singular layer contains branching points of the depth. These layers, in addition to the structures described in (b), contain special normal forms, representing the depth branching.

Figure 17A:
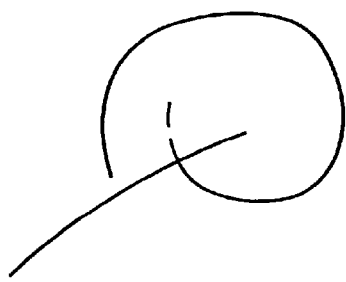
FIG. 17a shows a "logarithmic" normal form. It contains an edge, which ends inside the considered cell, and a background, whose depth is continuous everywhere except the edge, and jumps along the edge.
Figure 17B:
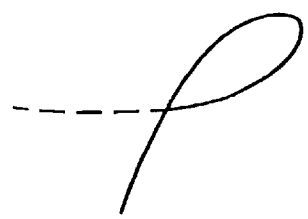
FIG. 17b shows a "loop" normal form. It contains an edge, which makes a loop inside the considered cell, crossing itself on a different depth.

The following normal forms are used:
(i) "Logarithmic" normal form. It contains an edge, which ends inside the considered cell, and a background, whose depth is continuous everywhere except the edge, and jumps along the edge (FIG. 17a).
(ii) "Loop" normal form. It contains an edge, which makes a loop inside the considered cell, crossing itself on a different depth (FIG. 17b).

Figure 18A:
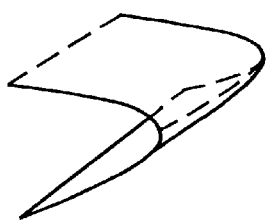
FIG. 18a shows a "fold" normal form.
Figure 18A:
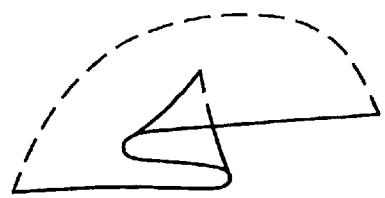
Figure 18A:
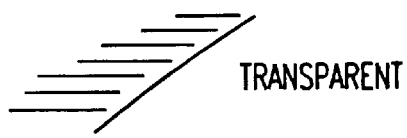

(iii) Fold normal form. This is one of the Whitney stable singularities of the projection of a 3D-surface on the screen plane. It is represented by an edge, two background layers on one side of the edge, and a transparent region on another side (FIG. 18a).

Figure 18B:
FIG. 18b shows a "cusp" normal form.
Figure 19:
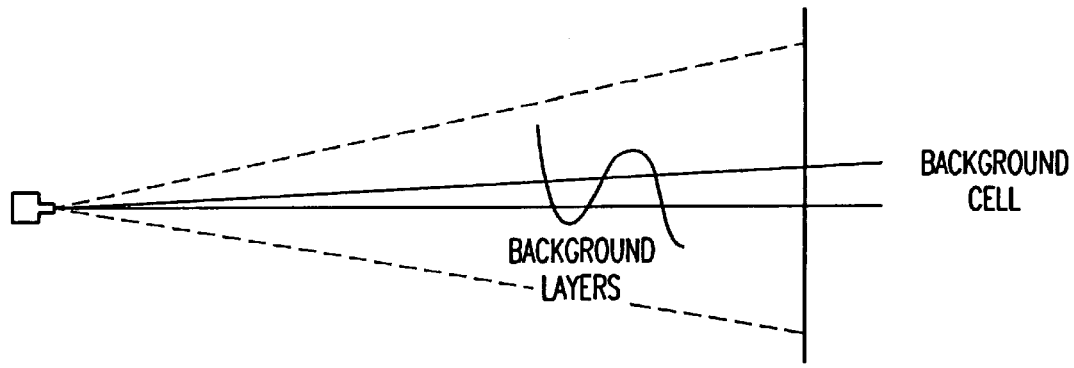
FIG. 19 and FIG. 20 illustrate rendering of normal forms from a viewer position, different from the original one.

(iv) Cusp normal form. This is the second Whitney singularity. It is represented by an edge (with a cusp-type singularity) and a background layer, depth is univalued on one side of the edge, and forms a triple covering of the other side (FIG. 18b). Both the types (iii) and (iv) of singularities and their normal forms are well-known in the mathematical literature (see V. I. Arnold, Singularity Theory, Springer Verlag, 1998 and Y. Elihai, Flexible High Order Discretization, Ph.D Thesis, Beer-Sheva, 1995).

While the normal forms of types (i) and (ii) arise naturally in images, containing complicated edge geometry (leaves of the tree, etc.), the normal forms (iii) and (iv) usually appear as the visual parts of the boundaries of smooth 3D-bodies. These last two types also play a central role in a rendering of true three-dimensional models, and in particular in their transforming into the structure of a virtual 3D-image (see section 7 below). The quantization and the compression of the virtual 3D-image data is performed in exactly the same way as that of still images (see I above). This completes the description of the structure of a virtual 3D-image.

2. Rendering of virtual 3D-images (i) The structure of a virtual 3D-image, as described in II.1 above, is adjusted to a certain fixed camera (or viewer) position. Indeed, the background cells, being the cells on the screen, correspond to the angular coordinates with respect to the camera, while the depth is the distance of the object from the camera.

Figure 20:
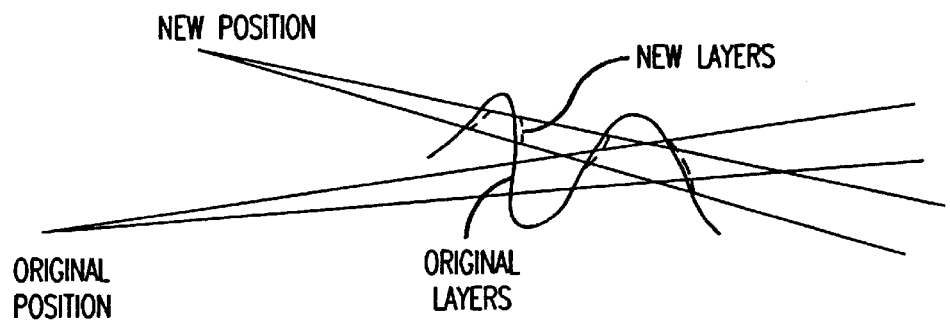

If another viewer position is given, the first step in an image rendering is the construction of a completely similar structure of a virtual 3D-image, but associated with a new viewer position (FIG. 20). This is done in several steps:

(a) A transformation ψ is constructed, which transforms the screen coordinates and the depth of each point with respect to the initial viewer position, into the screen coordinates and the depth with respect to the new viewer position. (A construction of the transformation ψ is well-known in mathematics and imaging literature; see D. Hilbert, S. Cohn-Vossen, Anschauliche Geometrie, Berlin, 1932.)

(b) The transformation ψ is applied to each model in the original representation of the virtual 3D-image. More accurately, it is applied to each point where the geometry or the profile of the model are represented, as well as to parabolic segments and the widths, representing the geometry of the model. ψ is applied according to the screen coordinates of these objects and the depth, stored in these objects, as described in II.1. The brightness values of the models remain unchanged. As a result, each model is represented in a screen coordinates and a depth, corresponding to a new viewer position. The same transformation is also applied to the background representing points (see I.12).

(c) For each cell of a viewer's screen, the models, which intersect a neighborhood of this cell, are found. These models are subdivided into several groups, each corresponding to one depth layer over the considered cell.

(d) On each layer the background partition is performed as described in I.11. For each background region, its depth and the brightness are constructed by averaging of the corresponding values at the images under the transformation ψ of the original background representing points.

This completes a transformation of the virtual 3D-structure according to a new viewer position.

(ii) Depth sorting (z-buffer) and final image rendering.

Figure 21:
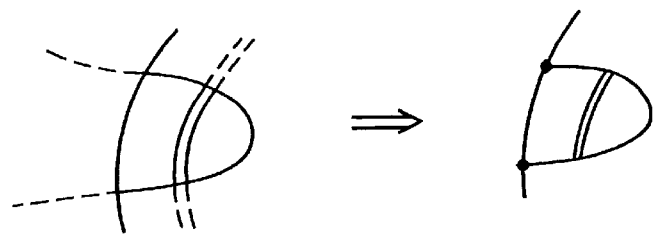
FIG. 21 illustrates depth sorting (z-buffer) and final image rendering.

In order to produce a final image, as seen from the new viewer position, the virtual 3D-image representation described above must be sorted over each background cell, in order to find visible parts of the image. This sorting is done as follows:

The layer which is the closest to the viewer is considered. The background partition regions of this layer, which are not transparent, enter with their brightness values into the final image representation. The transparent regions are further subdivided according to the partition of the second (from the viewer) layer. In this subdivision, new joints are constructed at the crossings of models from different layers. The non-transparent regions enter the final representation, while the transparent ones are further processed according to the third layer, etc. (FIG. 21).

Since on each subdivision step new joints are constructed at each model intersection point, the resulting structure is identical to the compressed still image structure, described in I above. It is finally expanded to a bitmap by a fast expansion software (or a dedicated hardware). Notice that all the rendering operations, except the very last bitmap expansion step, are performed on a compressed data, so that they are computationally inexpensive. It is important to stress also that an apriori bound on the maximal cell representation complexity is imposed (approximately the same as for still images). The information exceeding this bound is ignored. This completes a description of the rendering of a virtual 3D-image in order to produce its view from a prescribed position.

3. Interactive creation of virtual 3D-images

An input for an interactive creation or a virtual 3D-image is one or several still images, videosequences, etc. The following operations are performed to create a virtual 3D-image starting from a still image of a certain 3D-scene.

(i) Still image is compressed according to part I above.

(ii) The edges, ridges and N3-models form a partition of the image. If necessary, this partition is completed or simplified, interactively.

(iii) On each part of the resulting image partition, a continuous depth function is introduced. This is done interactively, using a tool similar to "Photoshop". (The depth is interpreted as a "color", and the image is "painted" with the depth.) Notice that the depth function can jump along the partition models.

(iv) On this stage the depth created is automatically translated into model depth data of a virtual 3D-image, as described in II.1 above.

(v) The obscured parts of the image are automatically completed to a prescribed extent by continuation of the nonobscured models. If necessary, the obscured parts can be interactively completed using all the usual image processing tools. In particular, parts of other images can be inserted into the obscured parts.

This basic step, (i) to (v), can be combined with various additional interactive constructions. For example, two virtual 3D-images can be superimposed with one another on different depths. Some objects from one image can be inserted into the second one, etc. The true depth data on virtual 3D-images, as well as true 3D-models or synthetic 3D-objects, can also be interactively incorporated into a virtual 3D-structure.

4. Automatic creation of virtual 3D-images

Any known method of automatic depth detection, which produces a depth map on the still image, can be combined with the procedure described in 3 (iv) to produce completely automatically a virtual 3D-image. However, a detection process, described in part I above, can be transformed into an efficient depth detection method, especially appropriate for the purpose of constructing virtual 3D-images.

Assume that a videosequence, representing a 3D-scene from a known camera trajectory, is given. Then (i) On each frame, the initial detection steps are performed, and the basic elements—segments and edge elements—are constructed, a described in IL 103389 (and/or in I above).

(ii) One of the frames is specified as the reference one. For each basic element on this frame, its motion is detected. This is done either by the method described in IL 103389, section "motion estimation" (extended similarly to edge elements) or by the following simple construction: Since the camera trajectory is known, the motion direction of each element is also known. Thus on the frame neighboring to the reference one, the elements are found nearest to the reference frame elements, which are displaced in the known motion direction. If the main parameters of the elements found (the direction, curvature, slope, etc.) are approximately the same as the ones of the initial element, it is considered as the result of the motion of the initial element.

As a result of a combination of these two methods, the motion is detected for each element of the reference frame.

(iii) Knowing this motion and the camera position, and the trajectory, the depth is computed for each element, according to a well-known formula (D. Hilbert, S. Cohn-Vossen, Anschauliche Geometrie, Berlin, 1932). Thus the depth is associated to each basic element existing on the reference frame.

(iv) On this stage the hidden parts of the scene are completed. This is done as follows: The basic elements and their depths are computed for each frame of the sequence. Then the transformation $\psi$, as described in 2(i)(a) above, is applied to these elements, transforming them into the corresponding elements on the reference frame. Notice that, as a result, some elements on the reference frame will appear several times, but also the elements invisible from the initial camera position will be completed. Notice also that some points of the reference frame can contain now several basic elements, pointing in different directions, each one on a different depth level.

(v) Now the construction of the components and the rest of the models construction is performed exactly as in part I above, with the following difference: the basic elements are connected in one component only if their depth changes gradually.

The depth value of the models is computed from the depth value of the basic elements exactly in the same way as the brightness values (see IL 103389). The depth of the background is constructed exactly as the brightness value, by averaging the depth of local basic elements in the corresponding region. This completes the description of the automatic production of virtual 3D-images.

5. A net of virtual 3D-images

Each virtual 3D-image represents a 3D-scene, as seen from the viewer position in a vicinity of the original position (its angular size may be of 25°–30° and more). Therefore, to represent a scene as seen from any prescribed point, a net of interrelated virtual 3D-images can be used. Since each virtual 3D-image is normally compressed to a small fraction of a data volume of a corresponding still image, this net still forms a very compact representation of a 3D-scene. However, to provide a continuous rendering of the scene, as the viewer position moves, the representations, obtained from each one of the virtual 3D-images in the net, must be interpolated. This is done by identifying and interpolating the corresponding models on the neighboring virtual 3D-images in the net. This procedure of the models identification and interpolation is described in detail in IL 103389, "Compression of videosequences".

6. A true 3D-model representation

On the base of a virtual 3D-image structure, described above, a model-based representation of the true 3D-structure of 3D-photorealistic scenes can be created. This representation is related to the well-known voxel representation exactly in the same way as the still images model representation, described in section I above, related to the original pixel representation. In other words, the voxels (which are the volume elements in the size of the pixel) are replaced by the models whose typical scale is about 12 pixels. Experiments show that one can expect an average number of less than ten models in one scale-size cube, so an expected compression (in comparison to the voxel representation) can be of order $12^3/10 \cong 150$.

The main assumptions in the construction of 3D-models are the same as in the construction of 2D-models, described in part I above. They are related to the experimental fact that, to capture any image in a visually lossless form by models in a basic scale of the order of 10 pixels, a small number of models suffices.

The following list represents the basic 3D-models used:

(i) "3D-edge", which is represented by a smooth surface, bounding a closed part of the 3D-space.

(ii) "3D-ridge", which is represented by a smooth surface, separating two open parts of the 3D-space.

(iii) "3D-wires", represented by a smooth 3D-curve, with a certain smoothly changing transversal section.

(iv) "3D-patches", represented by 3D-bodies of the total size smaller than the scale size.

(v) All the above models, with the piecewise smooth geometry.

(vi) All the 2D-models, as described in part I above.

These models can appear in a representation of a texture on 3D-surfaces.

The construction of 3D-models is performed as follows:

Virtual 3D-images of the processed 3D-scene are constructed, as described in part II above, in such a way that any "open" (or "visible") part of the scene is represented at least in one of these images. The elements of these images actually represent parts of the 3D-models to be constructed. For example, the background with the depth data forms the "3D-edges" and "3D-ridges" above, the edges form either the geometric edges of these surfaces, or the singularities of their projection to the screen plane, the ridges form "3D-wires". In this way the data from several virtual 3D-images is combined to represent true 3D-models.

A true 3D-model representation obtained in this way can be rendered by producing first a virtual 3D-image, corresponding to the given viewpoint. This operation is described in more detail in the next section.

7. Constructing a virtual 3D-image from a true 3D-model

In many applications, a true 3D-model of a certain 3D-scene can be known. For example, a Digital Terrain Mapping (DTM) of a certain terrain can be given together with its aerial photography. In this situation, the method described above allows one to use the compressed representation of both the DTM and the aerial photography, to create a combined 3D-structure. Then a very fast rendering of this structure can be obtained, as follows:

(i) A projection mapping P of the terrain to the screen is constructed. The mathematical parts of this construction, as well as the inversion of P used below, is described in Y. Elihai, Flexible High Order Discretization, Ph.D. Thesis, Beer-Sheva, 1995.

(ii) A local and global inversion of this mapping P is constructed, as described in Y. Elihai, Flexible High Order Discretization, Ph.D. Thesis, Beer-Sheva, 1995.

(iii) Singular curves of P are constructed, as described in Y. Elihai, Flexible High Order Discretization, Ph.D. Thesis, Beer-Sheva, 1995.

(iv) A virtual 3D-image structure is created. In this structure, the local branches (see II, 1 above) are formed by the local branches of $P^{-1}$, the fold and cusp singularities of P (see Y. Elihai, Flexible High Order Discretization, Ph.D. Thesis, Beer-Sheva, 1995) correspond to the fold and cusp normal forms in II.1, (iii) and (iv) above.

Each model of the compressed aerial photography enters the virtual 3D-image structure, being transformed by P. This completes the construction of the virtual 3D-image from the true 3D-model. A further rendering is performed, as described in II.2 above. An important property of the above process is that no "ray tracing" is applied. Instead, the direct projection of the texture models is constructed, which is much simpler computationally.

8. Concluding remarks (a) The combined method data (see I.15 above) can be included into the virtual 3D-images data structure exactly in the same way as the "hill" model above.

(b) Various additional methods for an automatic depth detection for the above models can be used. For example, focussing and refocussing of the camera produces easily controllable effects on the models parameters, depending on their depth. In this way the model's depth can be automatically detected in many important applications, like tronic microscope imaging, etc. Also the assumption that the trajectory of the camera is known, can be avoided.

(c) The construction of virtual 3D-images can be expanded exactly in the same way to the virtual 3d-structure on videosequences, including free motion of the represented objects.

(d) Many of the constructions used in a 3D-representation above can be used, with minor modifications, in a compression of videosequences.

(e) The methods of motion detection of the models, given above and in IL 103389, can be used with no relation to the further virtual images construction. For example, by this methods depth detection can be performed, and moving points on videosequences can be traced. Also identification of points on two images of the same object, can be done using the models described above and in IL 103389.

(f) An important feature of the method presented above is that all the constructions involved are local and straightforward. As a result, an overall computational complexity of this method is low.

(g) Various 3D-processing operations like ray tracing, light processing, etc., can be performed on virtual 3D-images data.

We claim:

1. A process for picture representation by data compression which comprises the steps of:

subdividing the picture into regions;

registering for each region a set of brightness values;

fixing for each region a characteristic scale in terms of a number of pixels;

dividing each region into cells, each of said cells comprising a number of pixels defined by two coordinates, said cells having a linear dimension in the order of said characteristic scale;

identifying in each cell basic structures chosen from among smooth areas, positive and negative hills, and curvilinear structures chosen from among edges and ridges;

constructing for said curvilinear structures geometric models comprising lines approximating the center lines of said structures and parameters defining the profiles of said structures;

associating to each of said smooth areas, positive and negative hills and geometric models of curvilinear structures, a mathematical model;

condensing said mathematical models to define a global mathematical model for the cell;

quantizing and encoding the data defining said global mathematical model; and storing and/or transmitting said data as representing the primary compression for the picture;

whereas in order to improve the fidelity of picture representations, visual adjacency relations between said basic structures are identified and represented as mathematical adjacency relations between said mathematical models.

2. Process according to claim 1, wherein a background partition takes into account said adjacency relations.

3. Process according to claim 1, wherein one of chains and graphs formed by said models join one another at joints defined by said adjacency relations.

4. Process according to claim 1, comprising geometric approximation of curvilinear structures by spline functions.

5. Process according to claim 1, wherein basic structures are defined by approximating the brightness function by the second degree polynomials on 3×3 pixels cells and by the third degree polynomials on 5×5 pixels cells.

6. A process of picture representation by data compression which comprises the steps of:

compressing pictures by the process according to claim 1;

forming a difference picture between the original one and the compressed one;

compressing said difference picture by a compression method;

adding said compressed difference picture to said originally compressed picture.

7. A process of compressed representation of three-dimensional scenes, which comprises the steps of:

producing one or several compressed images of the 3-D scene by a process according to claim 1;

associating to each said model of said compressed image or images a depth value;

storing and/or transmitting data defining each model, including said depth values, said data representing the primary compression of the 3-D scene;

producing the view of said 3-D scene from any prescribed point by processing of said data.

8. Process according to claim 7, comprising further compressing of said primary compressed data by further quantization and loss-less compression.

9. Process according to claim 7, comprising interactive depth creation.

10. Process according to claim 7, comprising automatic depth creation.

11. Process according to claim 7, comprising application of 3-D image processing operations to said compressed data.

12. Process according to claim 7, wherein said images of said 3-D scene form an interrelated net.

13. A process of compressed representation of 3-D scenes, which comprise the steps of:

producing one or several representations of the 3-D scene by the process according to claim 7; and combining the data of said representations to form local 3-D models.

14. Process according to claim 13, comprising rendering of the data by transforming said data to one said representation.

15. A process of representation and fast rendering of combined 3-D texture data, comprising the steps of:

compressing texture data by the process according to claim 1; and performing rendering operations on said compressed data.

16. A process of fast rendering of combined 3-D texture data, wherein the rendering is performed by transforming said data into representation according to claim 7.

17. A process of depth detection, comprising the steps of:

compressing several images of the 3-D scene by the process according to claim 1;

comparing the parameters of the resulting corresponding models; and computing the depth through the difference in said parameters.

18. Process according to claim 17, wherein images are fixed from different positions and the correspondence between the resulting models is produced by motion detection.

19. Process according to claim 17, wherein said images differ from one another by the camera focusing.

20. A process of points identification on different images of the same 3-D scene, which comprises the steps of:

comprising said images by the process according to claim 1; and analyzing the resulting models and identifying the corresponding points.

21. Process according to claim 20, wherein given points are traced in video sequences.

22. Process according to claim 6, wherein the compression method is one of a wavelets method and a JPEG method.

* * * * *